Jan. 6, 1953
F. S. NIELSEN
2,624,216
AUTOMATIC DIFFERENTIAL LOCK
Filed Aug. 15, 1950
2 SHEETS—SHEET 1
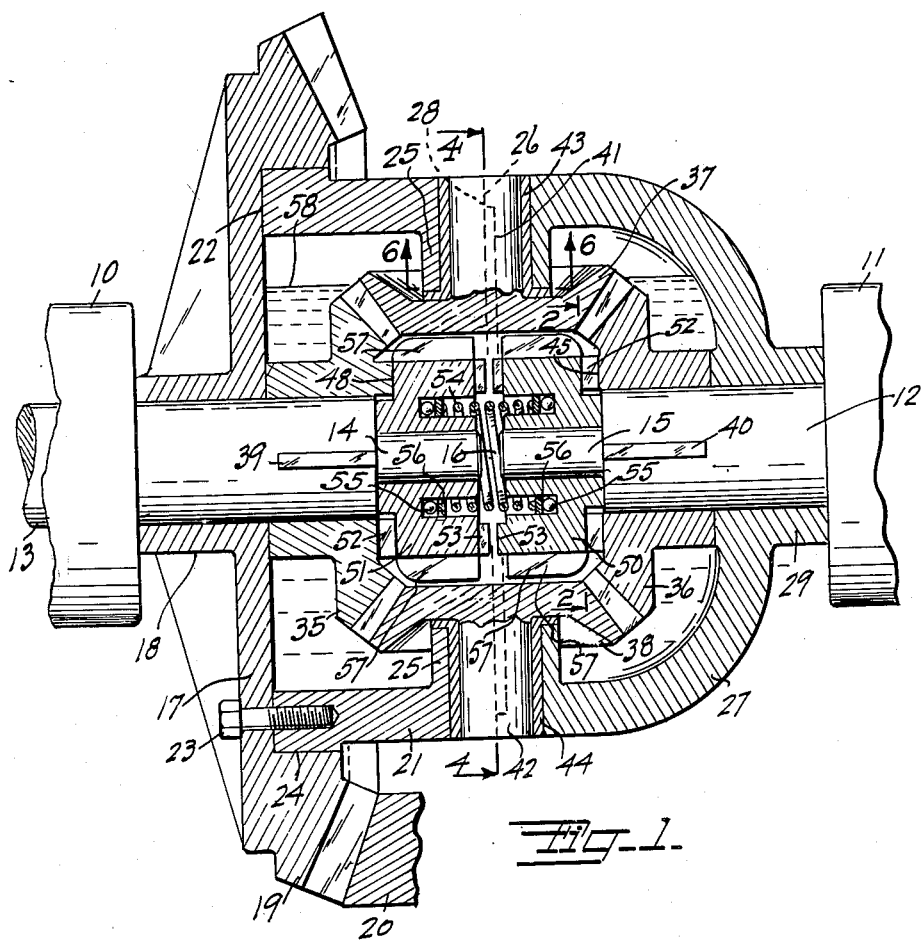
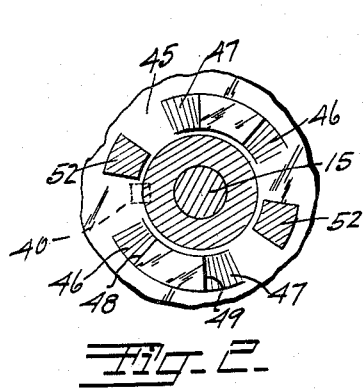
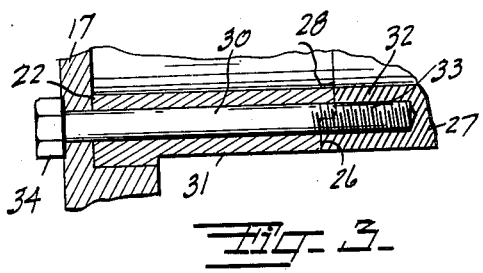
INVENTOR
Frank S. Nielsen
BY Philip A. Fredell
Attorney Jan. 6, 1953 F. S. NIELSEN 2,624,216
AUTOMATIC DIFFERENTIAL LOCK
Filed Aug. 15, 1950 2 SHEETS—SHEET 2

INVENTOR
Frank S. Nielsen
BY Philip A. Freidell
Attorney

Patented Jan. 6, 1953

2,624,216

UNITED STATES PATENT OFFICE 2,624,216

AUTOMATIC DIFFERENTIAL LOCK

Frank S. Nielsen, Oakland, Calif.

Application August 15, 1950, Serial No. 179,491

14 Claims. (Cl. 74—711)

This invention relates to improvements in means for locking the two rear axles of an automotive vehicle together when either of the rear wheels slips or rotates excessively fast relative to the other wheel, and provides a locking device within the differential which will automatically lock the axles together for equal power and rotation when either wheel slips, such as occurs when one wheel is on a slippery surface such as mud, sand, or on ice while the other wheel is on a surface providing traction, while automatically unlocking the axles as soon as traction and speed of the wheels become approximately uniform.

This device will not lock the axles together during conventional differential action such as while turning corners and requires a definite variation in the speed of the two wheels before the axles will lock together and will retain the axles locked so long as the one wheel has a tendency to spin.

The objects and advantages of the invention are as follows:

First, to provide means mountable within the differential of an automotive vehicle for automatically locking the rear axles together whenever one wheel slips, or when one wheel slips more than the other.

Second, to provide means as outlined which will not interfere with normal functioning of the differential such as for turning corners.

Third, to provide means as outlined which will release the axles for independent traction when traction is equalized for the wheels.

Fourth, to provide means as outlined which is enclosed with the differential within a sealed housing provided with an ample supply of viscous fluid.

Fifth, to provide means as outlined which cooperates between a pair of differential gears and provides a positive lock therebetween when either wheel slips.

Sixth, to provide means as outlined which is of the simplest possible construction and composed of an absolute minimum of parts, easy to install and economical to manufacture.

In describing the invention reference will be had to the accompanying drawings, in which:

Fig. 1 is a longitudinal sectional elevation through the invention.

Fig. 2 is a section taken on line 2—2 of Fig. 1 showing the automatic clutch engaging means.

Fig. 3 is a section through the wall of the housing showing the method of securing the housing together.

Figure 4:
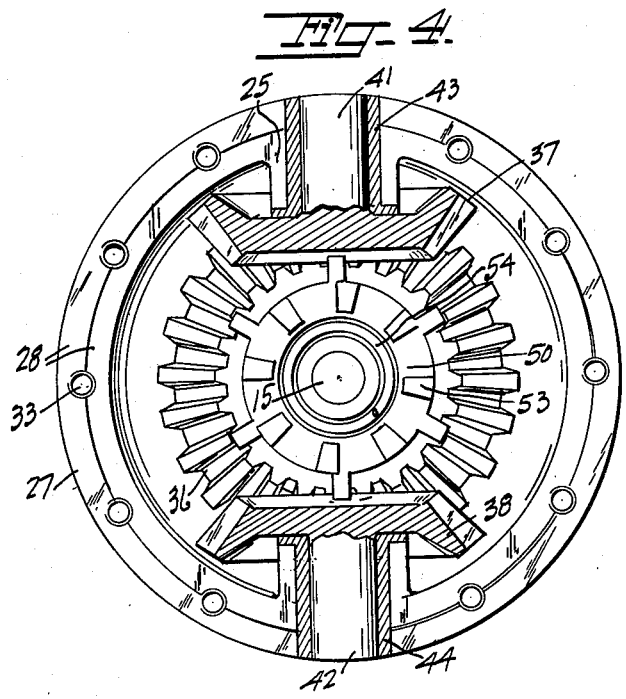
Fig. 4 is a section taken on line 4—4 of Fig. 1.
Figure 5:
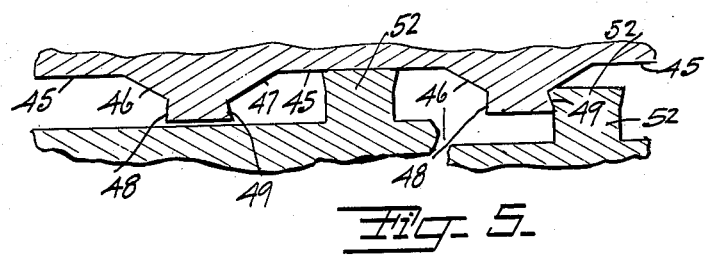
Fig. 5 is a development of the automatic clutch engaging means.
Figure 6:
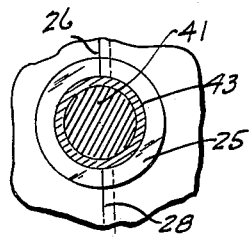
Fig. 6 is a fragmentary view showing the split in the housing at the radial bearings.

The invention includes the conventional axle bearings 10 and 11 and rear axles 12 and 13 of an automotive vehicle, these axles being modified by forming a journal of reduced diameter on the inner end of each as indicated at 14 and 15 with the inner ends of these journals just clearing each other as indicated at 16.

The housing consists of a head plate 17 having a hub 18 which is rotatable on the axle 13, and carries the differential drive gear 19 which is driven by the conventional drive pinion 20, and this drive gear may be formed integral with this head plate as shown, or may be secured thereto.

One end 21 of the housing has one end 22 fixed to the head plate as indicated at 23 and is formed with an enlargement 24 to fit in a bore in the gear 19 for positive centering. This one end has a half bearing for each of the differential pinion shafts as indicated at 25 with the axis of the bearing in alignment with the split 26, thus providing for convenient assembly of the differential and locking means.

The other end 27 of the housing has a stepped split 28 at one end to fit the stepped split 26 for accurate axial alignment and terminates at the other end in a hub 29 which is rotatable on the other axle 12, the two halves or ends 21 and 27 being secured together by any suitable means such as by cap screws 30 passing through the head plate 17 and wall 31 of the one end 21 and threadedly secured in the wall 32 of the other end as indicated at 33, with the heads 34 cooperating with the outside face of the head plate as shown.

Mounted on the inner end of each axle within the housing is a differential gear as indicated at 35 and 36 and these gears mesh with the differential pinions 37 and 38; the gears being suitably fixed on the axles as by keys 39 and 40 or by the conventional spline connection, while the pinions are formed integral with stub shafts 41 and 42 which are rotatable in the bushings 43 and 44 which are clamped between the two sections of the housing at the dividing line. The parts so far enumerated form the differential with the exception of the special housing which is sealed against escape of fluid.

The invention, in addition to the special housing consists of a combined cam and jaw clutch face formed on the inner hub faces of each differential gear, 35 and 36, and consists of an idle or root surface 45 continuing in each direction in a cam surface 46 and 47 which respectively terminate in a jaw face 48 and 49.

Rotatably mounted on each of the journals 14 and 15 is a clutch, respectively 50 and 51 having a jaw 52 for cooperation with the root surface, cam surface, jaw face, and formed on one end, and having cooperative jaws 53 on the other ends or adjacent faces, and a compression spring 54 is set in trepanned recesses formed axially in the respective clutches with the ends of the spring bearing on ball bearing 55 with interposed washers 56, this spring normally urging the clutches out of engagement. Each of these clutches has a series of radial vanes as indicated at 57, and the housing is filled with a viscous material such as a heavy oil or grease.

As is well known, the conventional automotive vehicle has the two rear axles on one end of which the rear wheels are mounted with the other end fixed in the differential gears. These differential gears 35 and 36 mesh with the differential pinions 37 and 38 and function only as keying means between the axles when the traction is equal on both wheels, and, if the vehicle is made to turn in either direction one wheel will turn slightly faster than the other and consequently the differential pinions will travel along with the housing and be slowly rotated in one direction then in the other as the vehicle is brought back to the original direction of travel, or if not brought back to the original direction of travel, then the pinions will maintain the instant position in the differential housing which was attained at the completion of the turn when the direction of the vehicle is again brought to straight ahead or back as the case may be.

This invention in no way interferes with this normal functioning of the differential, since relatively slow differentials in speeds of the two wheels will not tend to engage the interlocking mechanism for the axles because of the urgence of the spring therebetween.

However, should one wheel be free as when driving in ruts with the vehicle members such as the axle or frame resting on the ground, the spinning of that wheel will immediately cause the clutches to engage and lock the axles together, and the same occurs if one wheel is devoid of traction while the other has traction, such as occurs when one wheel is in sand, mud, or snow or on ice, while the other wheel rests on a fair traction surface.

Considering one wheel on axle 13 devoid of traction while the other wheel on axle 12 is on a good traction surface. Drive pinion 20 is rotating the housing 21, 27 at some predetermined speed depending on the speed of the engine and the reduction gear used, and the housing carries the differential pinions with it at the same speed. Without applicant's interlocking means, the axle 12 with gear 36 would remain stationary and the differential pinions would be rotated, driving the axle 13 at the combined normal speed for the two axles. With applicant's interlocking system, this speed-up of the gear 35 and the differential pinions would carry the fluid 58 around in the housing acting on the vanes 57 and carrying the clutch 51 with it with the jaws 52 riding up the cam surface and forcing the jaws 53 into engagement and these jaws carrying the other clutch member around until it engaged a jaw face 48 or 49, the two axles being then locked together and remaining so until the traction is equal on both wheels, at which time the spring acting between the clutches would return them to a non-engaging position for normal differential action. Obviously, because of the cam surfaces 46 and 47 between the opposed jaws, the locking effect will take place irrespective of which wheel spins, and will not take effect for conventional turns because the driving effect of the fluid is insufficient to lock the jaws for such slow speed differentials.

I claim:

1. A rear wheel drive for an automotive vehicle comprising coaxial rear axles, a sealed housing having a supply of fluid therein and rotatable on said axles; a differential gear fixed on each axle within said housing and each having a cam face, and intermeshing differential pinions mounted on radial axes, and interlocking means having cooperative clutch faces and interposed between said differential gears and having cooperative cam faces and having means cooperative with said fluid for retarding movement for bringing said clutch faces into operative engagement for interlocking of said axles for simultaneous and equal operation when one of said axles is driven at a speed greater than the normal differential speed between the axles, and including spring means cooperative between the interlocking means for releasing said interlocking means when the differential speed between the axles returns to normal.

2. A rear wheel drive for an automotive vehicle comprising coaxial rear axles, a sealed housing having a supply of fluid therein and rotatable on said axles, a differential gear fixed on each axle within said housing, and intermeshing differential pinions mounted on radial axes, and interlocking means interposed between said differential gears and cooperative therewith and cooperative with said fluid for interlocking said axles for simultaneous and equal operation when one of said axles is driven at a speed greater than the normal differential speed between the axles, and including means for releasing said interlocking means when the differential speed between the axles returns to normal; said interlocking means comprising cooperative clutches rotatably mounted on journals formed on the inner ends of the respective axles and having on their opposed ends teeth formed for cooperation with cam surfaces formed on said differential gears and having cooperative clutch teeth on their adjacent ends; spring means for normally maintaining said clutch teeth out of engagement, and vanes formed on the exterior of each clutch for reaction with said fluid for actuation of the clutches when one axle is driven at said speed greater than the normal differential speed.

3. Interlocking means for the rear axles of an automotive vehicle having a differential including differential gears and pinions, in combination; cam faces provided on said differential gears, a sealed housing for said differential gears and pinions and containing a fluid; clutch means having vanes cooperative with said fluid, said clutch means being slidable and rotatable on said axles and having opposed cam faces for cooperation with the cam faces on said differential gears for bringing said clutch means into operative engagement for locking said axles together for simultaneous and equal rotation when the rotational speed of either axle is greater than the other axle in excess of the normal differential action for turning corners and the like, and including spring means cooperative between said clutch means for releasing said axles for independent rotation when the urgence on the respective axles is externally equalized.

4. Interlocking means for the rear axles of an automotive vehicle having a differential, in combination; a sealed housing for said differential and containing a fluid, means cooperative with said fluid and with said axles for locking said axles together for simultaneous and equal rotation when the rotational speed of either axle is greater than the other axle in excess of the normal differential action for turning corners and the like, and including means releasing said axles for independent rotation when the urgence on the respective axles is externally equalized; said means comprising two clutches having cooperative engaging teeth on their adjacent ends and cam means at the other end for cooperative cam means carried by the respective axles, and vanes carried by each clutch for causing rotation of the clutches to cause engagement through differential rotation of the fluid relative to the housing.

5. Interlocking means for coaxial rear axles of an automotive vehicle having differential gears, comprising; two clutches slidable and rotatable on the adjacent ends of said rear axles and having positive engaging jaws formed on their adjacent ends and having cam means cooperative between the differential gears and the other ends of the clutches for advancing the clutches into engaging position when the differential speed between the axles exceeds a predetermined value and including spring means cooperating between said clutches for releasing said clutches when the axles are restrained exteriorly against excessive differential speeds as determined for normal differentials for changing the path of the vehicle.

6. Interlocking means for coaxial rear axles of an automotive vehicle comprising, two clutches carried by the adjacent ends of said rear axles and having cam means cooperative with cam means fixed on said rear axles for advancing the clutches into engaging position when the differential speed between the axles exceeds a predetermined value and including means for releasing said clutches when the axles are restrained exteriorly against excessive differential speeds as determined for normal differentials for changing the path of the vehicle; said interlocking means including a differential and a housing therefor and a supply of fluid in said housing, and said clutches having vanes for cooperation with said fluid for differential rotation of said clutches for cooperation with said cam means when either axle and its differential gear rotates at an excessive speed relative to the other axle and its differential gear.

7. Interlocking means for coaxial rear axles of an automotive vehicle comprising, differential gears, a cam fixed on the adjacent end portion of each differential gear, cooperative clutches slidable and rotatable on the respective adjacent end in the intervening space between the cams and having cooperative positive engaging jaws on their adjacent faces and having cooperative cam means formed on their other faces for cooperation with said cams, resilient means normally separating said clutches, with said cams urging said clutches into mutual engagement for locking said axles together when one axle rotates at a speed of predetermined value different from the other axle.

8. A structure as defined in claim 7; said cam and said cam means each having cooperative faces including a root portion with inclined faces formed in both directions and each inclined face terminating in a positive engaging jaw with a crown formed between the tops of the jaws, with the crowns normally resting on the roots and riding up an inclined face to move the clutches into engagement with the positive engaging jaws engaging to provide a positive drive between the axles.

9. A structure as defined in claim 7; a housing rotatable on said axles and having said cams and clutches housed therein and having a supply of liquid therein, said clutches having vanes for cooperation with said liquid for differential action for mutual actuation between the cams and cam means for moving the clutches into engagement when the axles rotate at predetermined different speeds.

10. A structure as defined in claim 7; said cam and said cam means each having cooperative faces including a root portion continuing in inclined faces in both directions terminating in positive engaging jaws, with the tops of the jaws resting normally on the roots and riding up an inclined face to move the clutches into engagement with the positive engaging jaws engaging when the clutches are in full engagement to provide a positive drive between the axles, a housing rotatable on said axles and having said cams and clutches housed therein and having a supply of liquid therein, said clutches having vanes for cooperation with said liquid for differential action for mutual actuation between the cams and cam means for moving the clutches into engagement when the axles rotate at predetermined different speeds.

11. Interlocking means for the coaxial rear axles of an automotive vehicle comprising, a housing rotatable on said axles and having a supply of liquid sealed therein, a differential gear fixed on each axle within said housing and having first cam means formed on their adjacent faces, differential pinions rotatably mounted in said housing and intermeshing with said differential gears, a clutch slidable and rotatable on the inner end of each axle and having second cam means formed on their opposite ends for cooperation with said first cam means and having positive cooperative jaws formed on their adjacent ends, resilient means normally maintaining said clutches in clearing relation, vanes on said clutches for cooperation with said liquid for differential movement of the clutches for causing cooperation between the first and second cam means for moving the clutches into engagement when a predetermined differential in rotational speed of the gears and housing exists, and freeing the clutches when the rotational speeds are within the limits of predetermined differential action between the axles.

12. A structure as defined in claim 11; said cam and said cam means having cooperative faces each including a root portion continuing in inclined faces in both directions and terminating in positive engaging jaws, with the tops of the jaws normally resting on the roots and riding up an inclined face to move the clutches into engagement with the positive engaging jaws engaging when the clutches are in full engagement to provide a positive drive between the axles.

13. Interlocking means for the coaxial rear axles of an automotive vehicle comprising; a sealed housing including a drive gear forming one end thereof, a supply of liquid in said housing, the respective ends of said housing including said drive gear being rotatable on the respective adjacent end portions of said axles, differential gears within said housing and fixed on the respective axles and having formed on their inner faces each a first combination cam and jaw face, differential pinions rotatably supported in said housing and intermeshing with said differential gears, a clutch rotatable and slidable on the inner end of each axle and having jaws formed on their adjacent ends for positive interlocking and including resilient means for normally maintaining said jaws in clearing relation, and having a second combination cam and jaw face formed on their outer ends for cooperation with said first combination cam and jaw face for limited relative rotational movement terminating in engagement of the jaws to cause the cams to move the clutches into mutual engagement, with the jaws of the first and second combination cam and jaw faces engaging to provide a positive driving connection between the axles when the difference in speeds between the axles exceeds a predetermined value.

14. A structure as defined in claim 13; said combination cam and jaw faces including each a root portion continuing in each direction in an inclined cam surface terminating in a positive engaging jaw, whereby, with rotational movement of the clutch on the axle, the jaws ride up the inclined faces to engage the clutches and terminate by engagement between the positive engaging jaws.

FRANK S. NIELSEN.

REFERENCES CITED

The following references are of record in the file of this patent:

UNITED STATES PATENTS

| Number | Name | Date |
|---|---|---|
| 1,104,005 | Romeiser | July 21, 1914 |
| 1,361,895 | Nogrady | Dec. 14, 1920 |
| 1,556,101 | Goodhart | Oct. 6, 1925 |
| 1,647,750 | Ross | Nov. 1, 1927 |
| 1,938,649 | Welsh | Dec. 12, 1933 |
| 2,375,938 | Moon | May 15, 1945 |
| 2,545,601 | Brubaker | Mar. 20, 1951 |